April 11, 1961        R. S. SMITH        2,978,851
PROCESS AND APPARATUS FOR PACKAGING MEATS AND OTHER ARTICLES
Filed Dec. 18, 1958
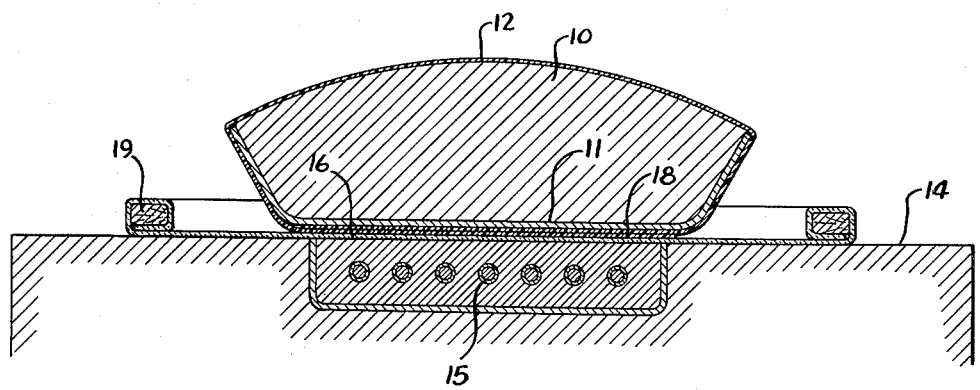
INVENTOR
R. STUART SMITH
by: Carlson, Pitzner, Hubbard + Wolfe
ATTY.

United States Patent Office 2,978,851
Patented Apr. 11, 1961

2,978,851

PROCESS AND APPARATUS FOR PACKAGING MEATS AND OTHER ARTICLES

Roy Stuart Smith, Palmyra, N.Y., assignor to National Distillers and Chemical Corporation, a corporation of Virginia Filed Dec. 18, 1958, Ser. No. 781,390

2 Claims. (Cl. 53—33)

The present invention relates to a method and apparatus for wrapping articles in transparent heat sealable plastic sheet materials, and more particularly, this invention relates to a method and apparatus which finds particular but not exclusive utility for wrapping moisture containing food products such as meats and produce in polyethylene film.

Polyethylene sheet overwrap material has certain properties making it valuable as a wrapping material for food products. For example, its high oxygen transmission characteristics make it highly suitable for use as a wrapping medium for packaging red meats, in which case oxygen transmission is necessary to preserve the bloom or red color of the meat. In most commercial retail meat packaging operations, for example, the meat is placed in a paperboard tray which is in turn wrapped in a sheet of a suitable transparent wrapping material such as cellophane having a heat sealing coating on its outer surface, that is on the outside of the package and not against the meat. This sheet of material is wrapped around the tray so that it overlaps itself on the bottom of the tray and the wrapped tray is then slid over a heated platen recessed in the wrapping table. Cellophane, being a non-thermoplastic material, is not affected by the heat of the platen, and only the heat sealable coating is affected. When polyethylene is used as an overwrap, however, and is slid over such a recessed heated platen, it fuses and sticks badly to the platen, does not form an effective seal, and loses its identity as a film. This is so because polyethylene is characteristically a thermoplastic material which melts and fuses at a relatively low temperature when compared to cellophane. In order to seal polyethylene, the overlapped layers must be heated sufficiently to melt and fuse together. Large areas of polyethylene, such as encountered in packages wrapped with the material, are heat sealed with difficulty because sufficient heat must be employed to fuse the layers together without completely melting and destroying the film. The use of a hot sealing iron or platen of the type employed for sealing a high melting point non-thermoplastic film, such as cellophane which is coated with a heat sealing substance, has not been generally successful for sealing polyethylene because, at the temperatures required to effect a seal, the polyethylene melts and sticks to the hot iron or platen instead of forming a satisfactory seal.

It is therefore the primary object of the present invention to provide a method and apparatus for imparting a satisfactory heat seal to packages wrapped in a sheet of thermoplastic wrapping material such as polyethylene film. Another object is to seal polyethylene film wrapping materials rapidly and efficiently without severely melting the material and causing the polyethylene to ball or tear and otherwise destroying the identity of the film.

A more specific object of the invention is to provide a heat transfer device which may be employed with a heated platen of the type commonly recessed into a work or wrapping table in order to facilitate its use with polyethylene film or sheet wrapping materials.

The formation of a liquid-tight seal is one essential requirement of a wrapping material for meats, particularly when the more juicy cuts are being packaged. If a tight seal is not formed, the package is likely to leak or drip creating an unsanitary condition inside the refrigerated meat case and often dripping on the floor or on the customers' clothing during the purchase.

It is therefore another object to provide a method for wrapping meats and the like with a wrapping material of the type characterized by polyethylene whereby a secure, fluid-tight seal is obtained so that juices and other fluids are retained within the package, sanitary conditions are improved, and consumer acceptability of the product is enhanced.

A further object of the present invention, is to provide an improved apparatus of the above type which, when used in conjunction with a heated platen in a wrapping table, enables the user to apply and seal a polyethylene film wrapping over the food products to form a neat, attractive package easily and efficiently with a minimum of effort and skill.

Other objects and advantages of the present invention will become apparent as the following description proceeds taken in connection with the accompanying drawing wherein the figure illustrates a package of meat wrapped with a sheet of polyethylene overwrap material and being sealed on a heated platen which is recessed in a worktable.

While a certain illustrative method and apparatus for wrapping and sealing packages with polyethylene sheet or film wrapping material will be described below in considerable detail, it should be understood that there is no intention to limit the invention to the specific method and apparatus disclosed. On the contrary, the intention is to cover all modifications, alternative constructions, equivalents and uses falling within the spirit and scope of the invention as expressed in the appended claims.

In the packaging of food products in transparent wrapping materials, the product such as a slice of meat shown at 10 in the drawing supported in a paper tray 11, is wrapped in a cut piece of transparent sheet material 12 by placing the material 12 over the top of a package and folding its cut edges underneath so that they overlap each other. This operation is commonly done on a worktable 14 having recessed therein a heated platen 15, the upper surface 16 of which is substantially flush with the surface of the worktable 14.

Where a high melting point overwrap material such as cellophane coated with a heat sealing substance is employed, the package will easily slide across the surface 16 of the platen. The heat activates the adhesive which effectively seals the cellophane wrapping around the product. Where polyethylene is employed as an overwrap material, however, as pointed out above, it cannot be slid across the heated platen to effect a seal because the polyethylene film melts at the temperature of the platen and sticks to its surface. As a result, the identity of the film is destroyed and a satisfactory seal is not formed.

In accordance with the present invention, for use in sealing polyethylene overwrap materials with a hot plate or platen, there is provided an appropriate heat transfer device 18 which may be interposed between the wrapped package and the hot platen. In this respect when a package 10 is overwrapped with a polyethylene sheet material 12 as described above, the package is placed on top of the heat transfer device 18 and the package and heat transfer device are then slid over the surface 16 of the platen 15. A sufficient amount of heat is transferred through the device 18 to fuse the polyethylene and effect a secure seal of the overwrap material.

The illustrative heat transfer device shown in the drawing comprises a glass cloth impregnated with tetrafluoroethylene resin and mounted on a wood or corrugated fiberboard frame 19. An advantage in the use of the heat transfer device 18 lies in the fact that packages when wrapped with the polyethylene overwrap material can be placed on the device 18 thereby holding the folded flaps in place for sealing. When the wrapped package is in place on the heat transfer device 18, it is slid over the surface of the heated platen, and if necessary held for a sufficient length of time to effect a seal.

The heat transfer device employed in the above described method for sealing polyethylene and other thermoplastic overwrap films is formed primarily of glass cloth, or other fabric made of a material which is resistant to the high temperatures encountered on the hot platen. This glass cloth is impregnated with polytetrafluoroethylene (Teflon) to form a heat resistant fabric. The polyethylene does not stick to the Teflon impregnated cloth and thus may be readily fused and sealed on a hot platen to produce a smooth, tight polyethylene-to-polyethylene bond. The Teflon impregnated cloth is readily attached to an open frame such as the wood frame shown in the drawing.

The thickness of the heat transfer device has not been found to be critical. The device need only be of sufficient thickness to withstand handling and use and should be thin enough to transmit a sufficient amount of heat to fuse and tightly seal the lapped polyethylene layers on the bottom of the wrapped package.

I claim as my invention:

1. The method of packaging articles in a heat fusable thermoplastic film material such as polyethylene film, consisting essentially of the steps of wrapping the article in the film by folding the film under the article so that the edge portions thereof overlap, placing the wrapped article on a plate-like heat transfer member freely movable in all directions over the surface of a heated platen having an upper surface which is nonadherent to the film when fused, sliding said member and package together over said heated platen so that the folded overlapping edges of the film are fused together to form a tightly sealed package, and removing the sealed package from the member.

2. The method of claim 1 wherein said heat transfer member comprises a glass cloth impregnated with polytetrafluoroethylene.

References Cited in the file of this patent

UNITED STATES PATENTS

| | | |
|---|---|---|
| 2,556,008 | Spalding | June 5, 1951 |
| 2,712,343 | Stanton | July 5, 1955 |
| 2,860,463 | Hartwig | Nov. 18, 1958 |